United States Patent [19]

Beyer et al.

[11] Patent Number: 4,756,537
[45] Date of Patent: Jul. 12, 1988

[54] CYLINDER HEAD GASKET

[75] Inventors: Horst Beyer, Burscheid; Karl-Heinz Maus, Wuppertal, both of Fed. Rep. of Germany

[73] Assignee: Goetze AG, Burscheid, Fed. Rep. of Germany

[21] Appl. No.: 889,925

[22] Filed: Jul. 28, 1986

[30] Foreign Application Priority Data

Jul. 26, 1985 [DE] Fed. Rep. of Germany ....... 3526818

[51] Int. Cl.$^4$ .............................................. F16J 15/12
[52] U.S. Cl. .................................. 277/235 B; 277/22; 277/233; 277/DIG. 6
[58] Field of Search ................. 277/22, 235 R, 235 B, 277/DIG. 6, 233, 234, 227, 228

[56] References Cited

U.S. PATENT DOCUMENTS

| | | | |
|---|---|---|---|
| 1,338,617 | 4/1920 | Fitzgerald | 277/235 B |
| 1,932,538 | 10/1933 | Sutcliffe | 277/235 B |
| 2,087,430 | 7/1937 | Cummins | 277/235 B |
| 4,083,570 | 4/1978 | Sugawara | 277/235 B |
| 4,243,231 | 1/1981 | Sugawara | 277/235 B |
| 4,254,963 | 3/1981 | Skrycki | 277/235 B |
| 4,311,318 | 1/1982 | Czernik et al. | 277/235 B |
| 4,397,472 | 8/1983 | Czernik | 277/235 B |
| 4,400,000 | 8/1983 | Morris | 277/235 B |
| 4,519,619 | 5/1985 | Doyle | 277/235 B |

FOREIGN PATENT DOCUMENTS

| | | |
|---|---|---|
| 1017416 | 12/1962 | Fed. Rep. of Germany . |
| 2433082 | 1/1976 | Fed. Rep. of Germany ... 277/235 B |
| 2714776 | 10/1978 | Fed. Rep. of Germany ... 277/235 B |
| 2856186 | 8/1982 | Fed. Rep. of Germany . |
| 3011216 | 8/1984 | Fed. Rep. of Germany . |
| 2518171 | 6/1983 | France . |
| 59-90745 | 5/1984 | Japan .............................. 277/235 B |
| 2073335 | 10/1981 | United Kingdom ............ 277/235 B |

OTHER PUBLICATIONS

Lechler Elring Dichtungswerke KG article "über den Einbau von Zylinderkopfdichtungen", by von Walter Stadelmann, Sonderdruck aus der ATZ Automobilitechnishe Zeitschrift, Iss. 9, Sep. 1966 & Iss. 11, Nov. 1966, pp. 3–10.

Primary Examiner—Robert S. Ward
Attorney, Agent, or Firm—Spencer & Frank

[57] ABSTRACT

A cylinder head gasket for use in an internal combustion engine having a cylinder head accommodating a precombustion chamber block having a bottom face, one part of which is adapted to engage the cylinder head gasket. The cylinder head gasket has an opening adapted to be aligned with a combustion chamber of the internal combustin engine. There is provided a space in the cylinder head gasket adjacent the opening of the cylinder head gasket. The space is adapted to be in alignment with the bottom face of the precombustion chamber block and is occupied at least in part by a component of a high-temperature resistant material.

10 Claims, 2 Drawing Sheets

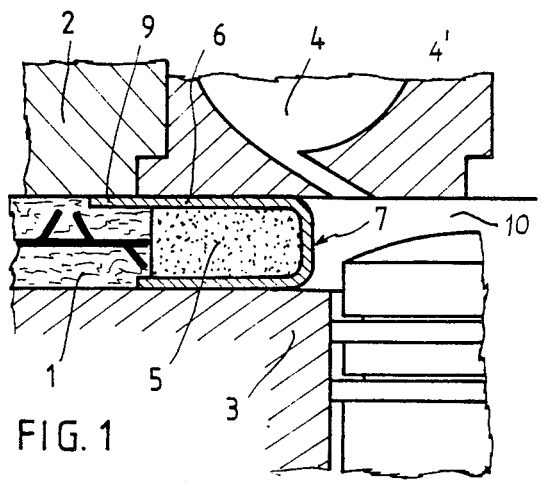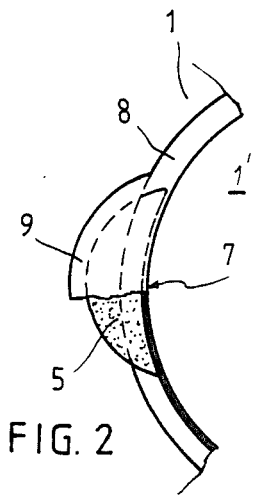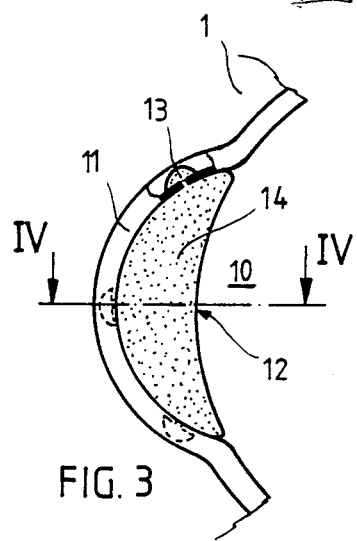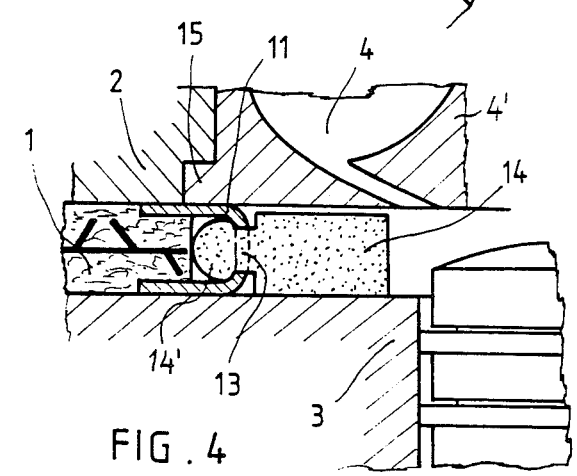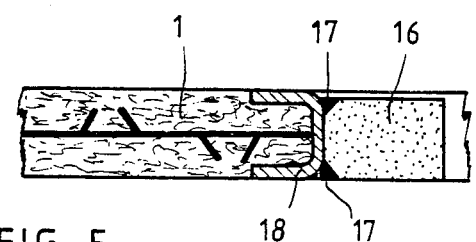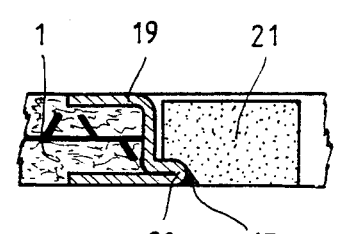

CYLINDER HEAD GASKET

BACKGROUND OF THE INVENTION

This invention relates to a cylinder head gasket for an internal combustion engine equipped with a precombustion chamber built into the cylinder head. One part of the bottom wall of the precombustion chamber block is in engagement with the cylinder head gasket.

For achieving a more thorough admixing and thus a better combustion of the fuel/air mixture, it is known to provide—particularly diesel engines—with a precombustion chamber, side chamber, turbulence chamber or Ricardo-chamber arranged upstream of the main combustion chamber. The walls constituting the block in which such auxiliary chambers are defined must be made of materials resisting high temperatures, such as metals or sintered ceramic, preferably sintered silicon nitride. The block is received in an appropriate cavity of the cylinder head as a separate structural component. The installed precombustion chamber block engages the cylinder head gasket with one part of its bottom face so that the precombustion chamber block is prevented from dropping out of the cylinder head and further, there is ensured a sealing of the main combustion chamber.

During engine operation, significant heat generation occurs in the precombustion chamber and the bottom face of the precombustion chamber block is thus heated to high temperatures. The cylinder head gasket must therefore be protected in a particular manner in the zone of engagement with the precombustion chamber block.

According to German Patent No. 2,856,186 the legs of the sheet metal armor which frames each gasket opening aligned with a respective main combustion chamber of the engine are extended in a tab-like manner in the zone of the precombustion chamber block.

According to German Patent No. 3,011,216 each gasket opening associated with a combustion chamber has a bay-like enlargement, as a result of which the precombustion chamber block engages the metallic frame of the cylinder head gasket only with an external, less heated edge zone.

According to U.S. Pat. Nos. 4,311,318 and 4,400,000 each gasket opening associated with a combustion chamber is surrounded by a metallic fire ring which is secured to the cylinder head gasket by means of a frame. In the zone of the bottom of the precombustion chamber block a recess or cutout is provided in the cylinder head gasket so that the precombustion chamber block engages with the bottom face the fire ring and the cylinder head gasket only along an edge zone of the chamber block bottom.

An appropriate sealing of the precombustion chambers, however, involves many difficulties. Thus, the significantly heated precombustion chamber walls which engage the tab-like extended legs of the gasket armor may impart excessive stresses thereto because of the thermal expansion forces, resulting in a reduction of the sealing pressure which may cause gas leakages. Particularly in case the precombustion chambers are made of up-to-date ceramic materials, a proper sealing is even more difficult to achieve because of the significantly higher temperatures as compared to those present in metallic precombustion chambers Further, ceramic precombustion chamber blocks are relatively brittle and breakable. In case of excessive sealing pressures, risks are high that the chambers break and therefore the prevailing sealing pressures must be unusually low.

Further, it is a disadvantage of bay-like enlargements in gasket openings that they constitute harmful free spaces facing the respective combustion chamber.

SUMMARY OF THE INVENTION

It is an object of the invention to provide an improved cylinder head gasket which is intended for use in an internal combustion engine equipped with a precombustion chamber block (particularly made of ceramic material) received in the cylinder head and from which the discussed disadvantages are eliminated.

This object and others to become apparent as the specification progresses, are accomplished by the invention, according to which, briefly stated, that zone of the cylinder head gasket which is engaged by the bottom wall of the precombustion chamber block is entirely or in part made of a high-temperature resistant material.

Preferably, the zone which is in engagement with the precombustion chamber block is of a high-temperature resistant material having a good plastic deformability and good thermosetting properties. The material is shaped as a plate segment which has the approximate thickness of the cylinder head gasket and which is inserted in a bay-like recess of the gasket, adjoining the gasket opening associated with a combustion chamber. Preferably, the material for the plate is an expanded foil graphite with or without a sheet metal carrier component, a soft-annealed copper sheet or a high-temperature resistant non-woven fiber mat based on ceramic fibers.

Thus, the precombustion chamber block lies, with its bottom face, partially on the plate insert and is effectively prevented from dropping out of the cylinder head. At the same time, between the bottom face of the precombustion chamber block and the supporting plate insert there is achieved—by virtue of the ready plastic deformability of the insert—an optimal seal even at unusually low sealing pressures. Ceramic precombustion chamber blocks are thus effectively protected against breakage during installation.

In accordance with the invention, it is also feasible to limit the engagement face of the precombustion chamber block on the cylinder head gasket to an outer and thus less heated narrow edge zone of the cylinder head gasket. The corresponding surface portion adjacent the edge of each gasket opening associated with a respective combustion chamber is removed and filled with a plate-shaped material made of a high-temperature resistant substance such as high-temperature resistant steel-ceramic or nickel-ceramic alloy, encapsulated graphite or the like. The plate-shaped element itself then does not constitute a support for the precombustion chamber block but functions as a labyrinth seal. The plate-shaped element or forepiece is formfittingly secured to the edge part of the cylinder head gasket by gluing, soldering, spot welding or crimping into lateral recesses of the gasket.

According to the invention it is feasible to appropriately shape the precombustion chamber block instead of providing a forepiece in the cylinder head gasket. The bottom face of the precombustion chamber block is, for this purpose, extended in such a manner that the space between the engagement zone of the precombustion chamber block on the cylinder head gasket and the combustion chamber edge is filled out without sealingly engaging the face of the cylinder block.

According to a further feature of the invention, the arrangement for supporting the precombustion chamber block on the gasket is formed of a radial projection (that is, a projection which extends parallel to the principal plane in which the gasket lies), and between the radial projection and the engagement face of the cylinder head gasket an additional sealing ring may be provided.

Thus, the invention provides a cylinder head gasket which prevents an overheating of the support which backs up the precombustion chamber block and which is formed by the armor framing the gasket opening, and thus a failure of the seal by thermal expansion is avoided. Particularly in case the support or forepiece for the precombustion chamber block is of a plastically easily deformable material, very low sealing pressures may be used and thus a ceramic precombustion chamber block may be optimally sealed without the risks of breakage. At the same time, a harmful dead space between the combustion chamber opening in the gasket and the sealing edge is filled out by the plate-shaped forepiece.

BRIEF DESCRIPTION OF THE DRAWING

FIG. 1 is a sectional elevational view of a preferred embodiment of the invention shown installed in an internal combustion engine.

FIG. 2 is a fragmentary top plan view of the preferred embodiment.

FIG. 3 is a top plan view of another preferred embodiment of the invention.

FIG. 4 is a sectional view taken along line IV-IV of the structure of FIG. 3, shown installed in an internal combustion engine.

FIG. 5 is a sectional elevational view of a further preferred embodiment of the invention.

FIG. 6 is a sectional elevational view of still another preferred embodiment of the invention.

DESCRIPTION OF THE PREFERRED EMBODIMENTS

Figure 7:
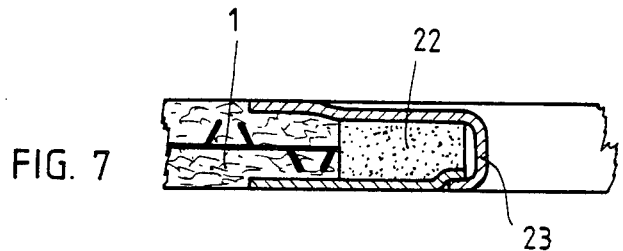
FIG. 7 is a sectional elevational view of still another preferred embodiment of the invention.

Turning to FIGS. 1 and 2, there is shown a cylinder head gasket 1 which is installed in an internal combustion engine between a cylinder head 2 and a cylinder block 3. A precombustion chamber block 4', defining a precombustion chamber 4, sealingly lies on a gasket forepiece 5. The latter is formed of a metal-reinforced material made of expanded graphite and is covered by a sheet metal frame 6. In the cylinder head gasket 1 there is shown a circular opening 1' which is provided in the cylinder head gasket 1 and which surrounds a combustion chamber 10 provided in the cylinder block 3. The gasket edge defining the opening 1' in the zone of the contacting precombustion chamber block 4' is designated at 7. The gasket edge 7 thus also constitutes circumferential edge of the combustion chamber 10. The metallic frame leg 8 of the gasket armor at the combustion chamber edge 7 is, in the zone of the precombustion chamber block 4' enlarged in a tab-like manner at 9 and secures the gasket forepiece 5 to the gasket 1.

In the embodiment illustrated in FIG. 3, the space 12 between the combustion chamber 10 and the armor 11 is enlarged in a bay-like manner and the enlargement is filled with a high-temperature resistant forepiece 14. The openings 13 distributed along the circumference of the armor 11 serve for securing the forepiece 14 to the cylinder head gasket 1.

Turning now to FIG. 4, in the embodiment shown therein the precombustion chamber block 4' has a radial projection 15 which rests on the gasket armor 11. Between the armor 11 and the projection 15 there is arranged the forepiece 14 which, however, does not form a seal with the precombustion chamber block 4'. The forepiece 14 is attached to the armor 11 by projections 14' which are fitted into armor openings 13.

According to the embodiment shown in FIG. 5, the high-temperature resistant attachment 16 is connected with the armor or frame 18 of the cylinder head gasket 1 by spot welds 17. In the embodiment according to FIG. 6 the armor or frame 19 of the cylinder head gasket 1 has a projection 20 with which the attachment 21 is connected by welding as shown at 17.

In the embodiment according to FIG. 7, the high-temperature resistant forepiece 22 is secured to the cylinder head gasket 1 by a frame plate 23.

Figure 8:
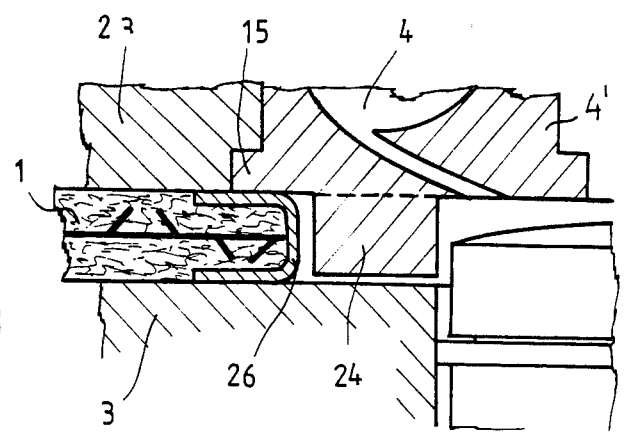
FIG. 8 is a sectional elevational view of still a further embodiment of the invention, shown installed in an internal combustion engine.

According to the embodiment shown in FIG. 8, the bottom of the precombustion chamber block 4' has a downward enlargement or projection 24 and thus constitutes a forepiece 24 in front of the cylinder head gasket 1. The projection is thus oriented generally perpendicularly to the principal plane in which the cylinder head gasket 1 lies. The precombustion chamber block 4' has, similarly to the embodiment shown in FIG. 4, a radial projection 15 which sealingly lies on the armor 26.

Figure 9:
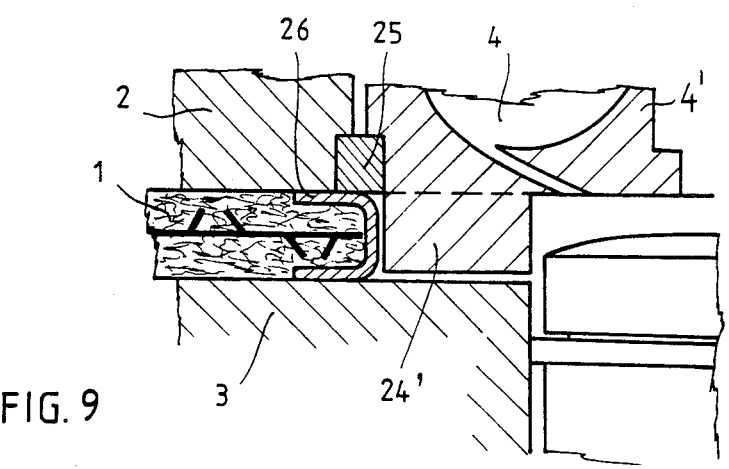
FIG. 9 is a sectional elevational view of still a further embodiment of the invention, shown installed in an internal combustion engine.

In the embodiment according to FIG. 9, between the cylinder head 2 and the precombustion chamber leg 24' there is arranged a steel ring 25 which sealingly engages the armor 26 of the cylinder head gasket 1 from the top.

It will be understood that the above description of the present invention is susceptible to various modifications, changes and adaptations, and the same are intended to be comprehended within the meaning and range of equivalents of the appended claims.

What is claimed is:

1. In a cylinder head gasket for use in an internal combustion engine having a cylinder head accommodating a precombustion chamber block having a bottom face; one part of the bottom face being adapted to engage said cylinder head gasket; an opening defined in the cylinder head gasket and adapted to be aligned with a combustion chamber of the internal combustion engine; said opening having a circular boundary; the improvement comprising a bay-like enlargement of said opening of the cylinder head gasket; said bay-like enlargement being adapted to be in alignment with said bottom face; and a plate-shaped insert of a high-temperature resistant material fully occupying said bay-like enlargement; said plate-shaped insert having an arcuate edge substantially coinciding with a length portion of said circular boundary; said plate-shaped insert being of a material different from that of said cylinder head gasket.

2. A cylinder head gasket as defined in claim 1, further comprising an armor surrounding said insert and securing said insert to said gasket.

3. A cylinder head gasket as defined in claim 1, wherein said component comprises a material selected from a group consisting of a high-temperature resistant nickel-ceramic alloy, a steel-ceramic alloy and encapsulated graphite.

4. A cylinder head gasket as defined in claim 1, wherein said component is secured to said armor by gluing.

5. A cylinder head gasket as defined in claim 1, wherein said component is secured to said armor by soldering.

6. A cylinder head gasket as defined in claim 1, wherein said component is secured to said armor by spot welding.

7. A cylinder head gasket as defined in claim 1, wherein said material is plastically deformable and said component constituting an engagement face being adapted for contacting said bottom face of said precombustion chamber block.

8. A cylinder head gasket as defined in claim 7, wherein said material is a soft-annealed copper sheet.

9. A cylinder head gasket as defined in claim 1, wherein said material is expanded graphite.

10. A cylinder head gasket as defined in claim 9, wherein said expanded graphite is metal-reinforced.

* * * * *